(12) United States Patent
Park

(10) Patent No.: US 8,094,524 B2
(45) Date of Patent: Jan. 10, 2012

(54) APPARATUS AND METHOD FOR RECORDING AND/OR REPRODUCING DATA TO/FROM RECORDING MEDIUM

(75) Inventor: Yong Cheol Park, Gwachon-si (KR)

(73) Assignee: LG Electronics Inc., Seoul (KR)

( * ) Notice: Subject to any disclaimer, the term of this patent is extended or adjusted under 35 U.S.C. 154(b) by 1140 days.

(21) Appl. No.: 11/081,642

(22) Filed: Mar. 17, 2005

(65) Prior Publication Data

US 2005/0207294 A1      Sep. 22, 2005

Related U.S. Application Data

(60) Provisional application No. 60/553,961, filed on Mar. 18, 2004.

(30) Foreign Application Priority Data

May 31, 2004   (KR) .................. 10-2004-0039143
May 31, 2004   (KR) .................. 10-2004-0039144

(51) Int. Cl.
*G11B 7/00* (2006.01)

(52) U.S. Cl. .............. 369/30.03; 369/53.16; 369/44.32; 369/44.33

(58) Field of Classification Search ............. 369/124.07, 369/59.25, 53.16, 47.14, 47.1, 30.1, 53.24, 369/44.27, 53.19, 53.15–53.17, 44.32, 44.33, 369/30.03, 275.3, 47.15

See application file for complete search history.

(56) References Cited

U.S. PATENT DOCUMENTS

| | | | |
|---|---|---|---|
| 5,111,444 A | | 5/1992 | Fukushima et al. |
| 5,237,553 A | | 8/1993 | Fukushima et al. |
| 5,315,447 A | | 5/1994 | Nakayama et al. |
| 5,386,402 A | | 1/1995 | Iwata |
| 5,448,728 A | * | 9/1995 | Takano et al. |
| 5,552,776 A | | 9/1996 | Wade et al. |
| 5,815,485 A | | 9/1998 | Tanaka et al. |
| 6,115,346 A | | 9/2000 | Sims, III |
| 6,189,118 B1 | | 2/2001 | Sasaki et al. |
| 6,223,303 B1 | * | 4/2001 | Billings et al. |

(Continued)

FOREIGN PATENT DOCUMENTS

CA       2 494 148       2/2004

(Continued)

OTHER PUBLICATIONS

International Search Report issued Sep. 16, 2005 in corresponding International Patent Application No. PCT/KR2005/000669.

(Continued)

*Primary Examiner* — Wayne Young
*Assistant Examiner* — Dionne Pendleton
(74) *Attorney, Agent, or Firm* — Harness, Dickey & Pierce, P.L.C.

(57) ABSTRACT

An apparatus and method for recording and/or reproducing data to/from a recording medium are disclosed. The recording medium includes at least one physical access control (PAC) cluster, the at least one PAC cluster including information for managing recording to and/or reproducing from the recording medium, wherein each PAC cluster includes a PAC header, common to each PAC cluster, and a PAC specific information area, which includes information specific to each PAC cluster, wherein the PAC header includes a segment information identifying at least one segment area in a user data area of the recording medium by a position information of the each segment area.

38 Claims, 8 Drawing Sheets

U.S. PATENT DOCUMENTS

| | | |
|---|---|---|
| 6,260,156 B1 | 7/2001 | Garvin et al. |
| 6,330,210 B1 * | 12/2001 | Weirauch et al. .......... 369/30.11 |
| 6,351,788 B1 | 2/2002 | Yamazaki et al. |
| 6,487,365 B2 * | 11/2002 | Cookson et al. .............. 386/217 |
| 6,526,522 B1 | 2/2003 | Park et al. |
| 6,580,684 B2 | 6/2003 | Miyake et al. |
| 6,615,363 B1 | 9/2003 | Fukasawa |
| 6,621,783 B1 | 9/2003 | Murata |
| 6,691,209 B1 | 2/2004 | O'Connell |
| 6,725,200 B1 | 4/2004 | Rost |
| 6,765,853 B1 * | 7/2004 | Ko et al. |
| 6,782,488 B1 | 8/2004 | Park et al. |
| 6,785,839 B2 * | 8/2004 | Ko et al. |
| 6,912,188 B2 | 6/2005 | Morishima |
| 6,963,523 B1 | 11/2005 | Park |
| 7,020,056 B2 | 3/2006 | Lee |
| 7,117,230 B1 | 10/2006 | Green et al. |
| 7,133,333 B2 * | 11/2006 | Ko |
| 7,219,202 B2 | 5/2007 | Satoyama et al. |
| 7,230,893 B2 | 6/2007 | Park |
| 7,272,086 B2 | 9/2007 | Hwang et al. |
| 7,400,564 B2 | 7/2008 | Ko et al. |
| 7,478,288 B2 | 1/2009 | Park |
| 7,480,764 B2 | 1/2009 | Park |
| 7,594,147 B2 | 9/2009 | Park |
| 7,680,022 B2 | 3/2010 | Park |
| 7,701,809 B2 | 4/2010 | Park |
| 2001/0018727 A1 * | 8/2001 | Ando et al. |
| 2001/0034856 A1 | 10/2001 | Ko et al. |
| 2002/0036643 A1 | 3/2002 | Namizuka et al. |
| 2002/0078295 A1 | 6/2002 | Shaath et al. |
| 2002/0136118 A1 | 9/2002 | Takahashi |
| 2002/0136134 A1 * | 9/2002 | Ito et al. |
| 2003/0035355 A1 | 2/2003 | Morishima |
| 2003/0048731 A1 | 3/2003 | Ozaki |
| 2003/0137910 A1 * | 7/2003 | Ueda et al. |
| 2003/0137915 A1 | 7/2003 | Shoji et al. |
| 2003/0169660 A1 | 9/2003 | Shirai et al. |
| 2003/0185130 A1 * | 10/2003 | Kamperman et al. |
| 2003/0210627 A1 | 11/2003 | Ijtsma et al. |
| 2003/0212564 A1 | 11/2003 | Sawabe et al. |
| 2004/0013061 A1 | 1/2004 | Wu |
| 2004/0017482 A1 | 1/2004 | Weitman |
| 2004/0174782 A1 | 9/2004 | Lee et al. |
| 2004/0174793 A1 | 9/2004 | Park et al. |
| 2004/0193946 A1 | 9/2004 | Park et al. |
| 2004/0218488 A1 | 11/2004 | Hwang et al. |
| 2004/0228238 A1 | 11/2004 | Ko et al. |
| 2004/0246852 A1 | 12/2004 | Hwang et al. |
| 2005/0083740 A1 * | 4/2005 | Kobayashi |
| 2005/0111315 A1 | 5/2005 | Hwang et al. |
| 2005/0169132 A1 | 8/2005 | Kuraoka et al. |
| 2005/0195716 A1 * | 9/2005 | Ko et al. .................... 369/53.16 |
| 2005/0207294 A1 | 9/2005 | Park |
| 2005/0207318 A1 | 9/2005 | Park |
| 2005/0207320 A1 | 9/2005 | Park |
| 2005/0259560 A1 | 11/2005 | Park |
| 2006/0083131 A1 | 4/2006 | Lee et al. |
| 2006/0120697 A1 | 6/2006 | Beged-Dov et al. |
| 2006/0221689 A1 | 10/2006 | Yoshida et al. |
| 2006/0280068 A1 | 12/2006 | Weirauch et al. |
| 2007/0053267 A1 | 3/2007 | Brondijk |
| 2007/0211589 A1 | 9/2007 | Park |
| 2007/0211590 A1 | 9/2007 | Park |

FOREIGN PATENT DOCUMENTS

| | | |
|---|---|---|
| CN | 1164924 | 11/1997 |
| CN | 1192818 * | 9/1998 |
| CN | 1441430 | 9/2003 |
| EP | 0 495 471 A2 | 7/1992 |
| EP | 0997904 * | 5/2000 |
| EP | 1 061 517 A1 | 12/2000 |
| EP | 1 251 508 | 10/2002 |
| EP | 1 251 508 A2 | 10/2002 |
| EP | 1 306 840 A2 * | 5/2003 |
| EP | 1 329 888 A1 | 7/2003 |
| EP | 1 381 047 | 1/2004 |
| EP | 1 381 047 A1 | 1/2004 |
| EP | 2242055 | 12/2004 |
| EP | 1 506 597 | 2/2005 |
| EP | 1505597 | 2/2005 |
| EP | 1587102 | 10/2005 |
| EP | 1 603 131 | 12/2005 |
| EP | 1 759 384 A0 | 12/2005 |
| EP | 1 887 577 A2 * | 2/2008 |
| JP | 5342817 | 12/1993 |
| JP | 06-259886 | 9/1994 |
| JP | 07-029177 | 1/1995 |
| JP | 07-121993 * | 5/1995 |
| JP | 07-200182 | 8/1995 |
| JP | 09-213011 | 8/1997 |
| JP | 10-049986 | 2/1998 |
| JP | 10-092149 * | 4/1998 |
| JP | 11-039801 | 2/1999 |
| JP | 11-066751 * | 3/1999 |
| JP | 2001-126407 | 10/1999 |
| JP | 2000-195178 | 7/2000 |
| JP | 2000-195181 | 7/2000 |
| JP | 2000-231757 | 8/2000 |
| JP | 2000-285029 | 10/2000 |
| JP | 2000-322835 * | 11/2000 |
| JP | 2000-322841 * | 11/2000 |
| JP | 2001-351334 * | 12/2001 |
| JP | 2002-015525 | 1/2002 |
| JP | 2002-092873 | 3/2002 |
| JP | 2002-124037 | 4/2002 |
| JP | 2002-175668 * | 6/2002 |
| JP | 2002-238015 | 8/2002 |
| JP | 2002-278821 | 9/2002 |
| JP | 2002-288938 | 10/2002 |
| JP | 2002-328848 | 11/2002 |
| JP | 2003-059063 | 2/2003 |
| JP | 2003-208779 | 7/2003 |
| JP | 2003-228835 | 8/2003 |
| JP | 2003-242650 | 8/2003 |
| JP | 2003-323769 * | 11/2003 |
| JP | 2003-346426 | 12/2003 |
| JP | 2004-005842 | 1/2004 |
| JP | 2004/030771 | 1/2004 |
| JP | 2004-030779 | 1/2004 |
| JP | 2004/039076 | 2/2004 |
| JP | 2004-280865 | 10/2004 |
| JP | 2004-288254 | 10/2004 |
| JP | 2007-503820 | 3/2005 |
| JP | 2005-339774 | 12/2005 |
| JP | 2006-313628 | 11/2006 |
| JP | 2008-052289 | 3/2010 |
| JP | 4611376 | 1/2011 |
| KR | 10-0619016 | 8/2006 |
| MX | PA05001548 A | 5/2005 |
| RU | 2208844 * | 7/2003 |
| RU | 2225043 * | 2/2004 |
| RU | 2 269 829 C2 | 2/2006 |
| RU | 2005-114052 * | 11/2006 |
| WO | WO 00/45386 | 8/2000 |
| WO | WO 01/01416 A1 * | 1/2001 |
| WO | WO 01/18731 A1 * | 3/2001 |
| WO | WO 01/22416 | 3/2001 |
| WO | WO 01/93009 | 12/2001 |
| WO | WO 02/52556 * | 4/2002 |
| WO | WO 02/067093 A2 | 8/2002 |
| WO | 03/030173 | 4/2003 |
| WO | WO 03/102936 A1 | 12/2003 |
| WO | WO 03/105141 | 12/2003 |
| WO | WO 03/105150 * | 12/2003 |
| WO | WO 2004/001753 A1 | 12/2003 |
| WO | WO 2004/001754 A1 | 12/2003 |
| WO | WO 2004/015708 | 2/2004 |
| WO | WO 2004/019326 A1 | 3/2004 |
| WO | WO 2004/025649 * | 3/2004 |
| WO | WO 2004/079730 A1 | 9/2004 |
| WO | WO 2004/081936 A1 | 9/2004 |
| WO | WO 2004/084217 | 9/2004 |
| WO | WO 2004/100159 | 11/2004 |
| WO | WO 2004/100159 A1 * | 11/2004 |

| | | |
|---|---|---|
| WO | WO 2005/004154 A2 | 1/2005 |
| WO | 2005/086598 | 9/2005 |
| WO | WO 2005/088636 A1 * | 9/2005 |

OTHER PUBLICATIONS

U.S. Patent Office Action dated May 13, 2008, for U.S. Appl. No. 11/061,665.
European Patent Office Action dated May 14, 2008, for European Patent Application No. 04808643.3-2223.
European Patent Office Search Report dated May 15, 2008, for European Patent Application No. 07111355.9-2223.
Blu-Ray Disc Association, "Rewritable Blu-Ray Disc (BD-RE) Multi-Media Command Set Description, Version 0.80", [Online] Nov. 9, 2004.
Search Report issued May 23, 2008 by the European Patent Office in counterpart European Patent Application No. 07120363.2-2223.
Search Report issued Aug. 4, 2008 by the European Patent Office in counterpart European Patent Application No. 07110264.4-2223.
Search Report issued Jul. 30, 2008 by the European Patent Office in counterpart European Patent Application No. 07150328.8-2223.
Office Action issued Sep. 12, 2008 by the USPTO in counterpart U.S. Appl. No. 11/155,485.
Office Action issued Sep. 3, 2008 by the USPTO in counterpart U.S. Appl. No. 11/085,134.
Office Action issued Dec. 2, 2008 by the U.S. Patent and Trademark Office in counterpart U.S. Appl. No. 11/798,561.
Office Action issued Nov. 7, 2008 by the U.S. Patent and Trademark Office in related U.S. Appl. No. 11/812,904.
Office Action issued Oct. 31, 2008 by the Chinese Patent Office in counterpart Chinese Patent Application No. 200710104074.X (with English language translation).
Office Action issued Jan. 10, 2008 by the Mexican Patent Office in a counterpart Mexican Patent Application.
Office Action issued Jan. 8, 2009 by the U.S. Patent and Trademark Office in counterpart U.S. Appl. No. 11/061,665.
Office Action issued Oct. 2, 2008 by the Mexican Patent Office in a counterpart Mexican patent application.
Office Action issued Mar. 18, 2009 by the Russian Patent Office in counterpart Russian Patent Application No. 2006136782/28 (English language translation).
Office Action issued Apr. 29, 2009 by the USPTO in counterpart U.S. Appl. No. 11/812,904.
Office Action issued May 26, 2009 by the USPTO in counterpart U.S. Appl. No. 11/798,109.
Decision on Grant issued Jun. 31, 2009 by the Russian Patent Office in counterpart Russian Patent Application No. 2006136783/28 (with English language translation).*
Office Action issued Apr. 29, 2009 by the USPTO in counterpart U.S. Appl. No. 11/812,904.*
"120 mm DVD Rewritable Disk (DVD-RAM)", ECMA Standardizing Information and Communication Systems, Standard ECMA-272, $2^{nd}$ Edition, Jun. 1999.
Australian Office Action dated Oct. 30, 2009.
Russian Notice of Allowance dated Oct. 22, 2009 for counterpart Russian application No. 2006136782/28(040043) and English translation.
Japanese Office Action dated Nov. 6, 2009 for counterpart application No. 2007-159500 and English translation.
Japanese Office Action dated Nov. 6, 2009 for counterpart application No. 2007-503825 and English translation.
Japanese Office Action dated Mar. 2, 2010 for counterpart application No. 2007-503820 and English translation.
Japanese Office Action dated Mar. 2, 2010 for counterpart application No. 2008-052289 and English translation.
Japanese Notice of Allowance dated Jun. 4, 2010 for corresponding Application No. 2007-503821.
Japanese Office Action dated Jun. 4, 2010 for corresponding Application No. 2008-033295.
Chan M.Y. et al.: "Two Simple Schemes for Access Control", IEEE International Symposium on Information Theory, Sep. 17-22, 1995, p. 355.
U.S. Notice of Allowance dated Aug. 17, 2010 issued in corresponding U.S. Appl. No. 11/798,110.
European Office Action dated Nov. 12, 2010 issued in corresponding European application No. 05 710 868.0-2223.
Chinese Patent Gazette dated Nov. 10, 2010 issued in corresponding Chinese application No. 200710104074.X.
Canadian Office Action dated Jul. 11, 2011 issued in corresponding Canadian Application No. 2,559,932.

* cited by examiner

|  |  | BD-RE | BD-R |
|---|---|---|---|
| INFO2 | Reserved | 128 | 128 |
|  | PAC 2 | 32 | 32 |
|  | DMA2 | 32 | 32 |
|  | CD2 | 32 | 32 |
|  | BZ3 | 32 | 32 |
| INFO1 | BZ2 | 32 | 32 |
|  | Drive Area | 32 | 128 |
|  | Reserved | 96 |  |
|  | DMA1 | 32 | 32 |
|  | CD1 | 32 | 32 |
|  | BZ1-PAC1 | 32 | 32 |

FIG. 4

| Sector in each PAC | Data Byte Position | Description | |
|---|---|---|---|
| 0 | $D_0$ to $D_3$ | PAC_ID | Common Header for all PACs |
| 0 | $D_4$ to $D_7$ | Reserved | |
| 0 | $D_8$ to $D_{11}$ | Unknown PAC Rules | |
| 0 | $D_{12}$ to $D_{13}$ | Reserved | |
| 0 | $D_{14}$ | Entire Disc Flag | |
| 0 | $D_{15}$ | Number of Segments | |
| 0 | $D_{16}$ to $D_{23}$ | Segment_0 | |
| 0 | $D_{24}$ to $D_{31}$ | Segment_1 | |
| 0 | ... | ... | |
| 0 | $D_{264}$ to $D_{271}$ | Segment_31 | |
| 0 | $D_{272}$ to $D_{383}$ | Reserved(not used) | |
| 0 | $D_{384}$ to $D_{2047}$ | Reserved for Specific PAC | |
| 1 to 31 | $D_0$ to $D_{2047}$ | Reserved for Specific PAC | PAC specific information |

FIG. 5

| Area | Control | | Number of bits |
|---|---|---|---|
| | Read | Write | |
| PAC zones 1,2 | Yes | Yes | 2 · 10 |
| Individual PACs | Yes | Yes | 2 |
| Control Data zones 1,2 | Yes | Yes | 2 |
| DMA zones 1,2 | No | Yes | 1 |
| Replacement clusters | No | Yes | 1 |
| Data Zone | Yes | Yes | 2 |
| Logical Overwrite | No | Yes | 1 |
| Reserved Area | Yes | Yes | 2 · 10 |
| Buffer zone 3 | Yes | Yes | 2 · 0 |
| Buffer zone 2 | Yes | Yes | 2 · 0 |
| Drive Area | No | No | 0 |
| Reserved Area | Yes | Yes | 2 · 6 |
| Buffer Zone 1 | Yes | Yes | 2 · 0 |
| Reserved for future areas | | | 11 · 6 |

APPARATUS AND METHOD FOR RECORDING AND/OR REPRODUCING DATA TO/FROM RECORDING MEDIUM

This application claims the benefit of the U.S. Provisional Application No. 60/553,961, filed on Mar. 18, 2004, in the name of inventor Yong Cheol PARK, entitled "Segment scope definition related with replaced defective cluster", which is hereby incorporated by reference as if fully set forth herein.

This application claims the benefit of the Korean Application Nos. 10-2004-0039143, filed on May 31, 2004, 10-2004-0039144, filed on May 31, 2004, which is hereby incorporated by reference as if fully set forth herein.

BACKGROUND OF THE INVENTION

1. Field of the Invention

The present invention relates to a high density optical disc, and more particularly, to an apparatus and method for recording and/or reproducing data to/from a recording medium.

2. Discussion of the Related Art

Optical discs are widely used for recording a large quantity of data. Among such optical discs, new high density optical media (HD-DVD), such as the Blu-ray Disc (hereinafter referred to as "BD") are under development, which enable long time recording and storing of high definition video and audio data. Currently, a global standard technical specification of the Blu-ray disc, which is considered to be a next generation HD-DVD technology as a data storing solution that significantly surpasses the present DVD, is under development along with other digital apparatuses.

Accordingly, various draft standards related to the BD is under preparation, and in succession to a rewritable Blu-ray disc (BD-RE), various draft standards both for Blu-ray disc writable once (BD-WO), and Blu-ray disc read only (BD-ROM) are also under development. In such course of standardization process, as a method for recording and/or reproducing the BD-RE/R/ROM, recently a physical access control (PAC) method has been under discussion for solving problems caused by a failure of a drive, which supports an existing version, in supporting a new version when it is intended to introduce new functions for the BD-RE/R/ROM into the new version.

SUMMARY OF THE INVENTION

Accordingly, the present invention is directed to an apparatus and method for recording and/or reproducing data to/from a recording medium that substantially obviate one or more problems due to limitations and disadvantages of the related art.

An object of the present invention is to provide a physical access control (PAC) method and a method and apparatus for recording and/or reproducing data to/from a recording medium by using the PAC method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium having a data structure for managing a data area of the recording medium includes at least one physical access control (PAC) cluster, the at least one PAC cluster including information for managing recording to and/or reproducing from the recording medium, wherein each PAC cluster includes a PAC header, common to each PAC cluster, and a PAC specific information area, which includes information specific to each PAC cluster, wherein the PAC header includes a segment information identifying at least one segment area in a user data area of the recording medium by a position information of the each segment area.

In another aspect of the present invention, a method for recording or reproducing data on a recording medium includes recording or reproducing at least one physical access control (PAC) cluster, the at least one PAC cluster including information for managing recording to and/or reproducing from the recording medium, each PAC cluster including segment information, if a PAC cluster is an unknown one and the segment information identifies at least one segment area in a user data area of the recording medium, recording to and/or reproducing from the at least one segment area by the PAC information, and if a defective area in the at least one segment area is replaced with a replacement area on a spare area of the recording medium, recording to and/or recording from the replacement area of the spare area by the PAC information.

In another aspect of the present invention, in a method for recording and/or reproducing data to/from a recording medium in response to a command from a host, a method for recording and/or reproducing data to/from a recording medium includes storing management information including PAC information read from the recording medium, determining a PAC_ID in the PAC information, and recording and/or reproducing data in accordance with unknown PAC rules and segment information recorded on the PAC, if the determined PAC_ID is not sensible, and if a defective area is encountered in a segment area of the segment information during the determining a PAC_ID and recording and/or reproducing data, sensing information on a replacement area written thereon in replacement of the defective area as a defect list (DFL) information in a defect management area (DMA), and managing the replacement area identically as the segment area belonging to the defective area.

In a further aspect of the present invention, an apparatus for recording and/or reproducing data to/from a recording medium includes a memory for storing PAC information read from the recording medium, and a microcomputer for determining a PAC_ID in the PAC information, and recording/reproducing data in accordance with unknown PAC rules and segment information recorded on the PAC, if the determined PAC_ID is not sensible, and if a defective area is encountered in a segment area of the segment information during the determining a PAC_ID and recording and/or reproducing data, sensing information on a replacement area written thereon in replacement of the defective area from defect list (DFL) information in a defect management area (DMA), and managing the replacement area identically as the segment area belonging to the defective area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 4 illustrates a structure of a PAC on the high density optical disc according to the present invention;

FIG. 5 illustrates a configuration of an "Unknown PAC Rules" field according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Figure 1:
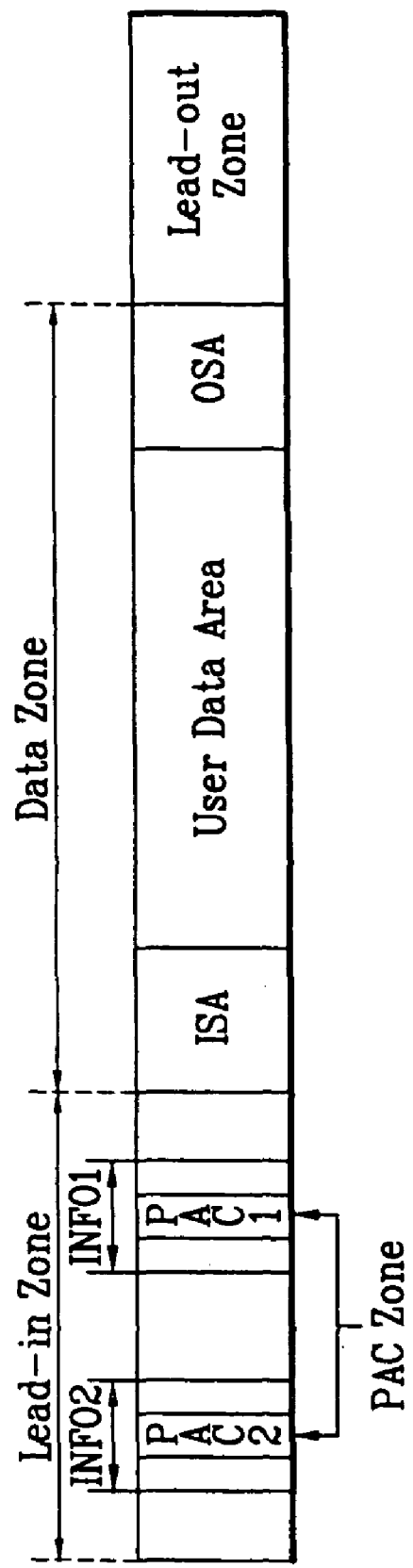
FIG. 1 illustrates physical access control (PAC) zones on a high density optical disc according to the present invention.

FIG. 1 illustrates PAC zones on a high density optical disc according to the present invention. Referring to FIG. 1, the high density optical disc is sectioned and designated as, from an inner circumference to an outer circumference, a lead-in zone, a data zone, and a lead-out zone. At a fore end and rear end of the data zone, there may be an inner spare area (hereinafter referred to as "ISA") and an outer spare area (hereinafter referred to as "OSA"), respectively. The spare areas ISA and OSA are areas for re-allocation of data to be written on a defective area thereto, when the defective area occurs in the data zone. The lead-in zone is sectioned, and designated as an INFO2 zone and an INFO1 zone for recording various kinds of information thereon. The INFO2 zone and an INFO1 zone have physical access control (PAC) zones, respectively.

For simplicity, the PAC zone assigned to the INFO2 zone is referred to as a PAC2 zone, and the PAC zone assigned to the INFO1 zone is referred to as a PAC1 zone. One of the PAC2 zone and the PAC1 zone has an original PAC recorded thereon, and the other one is a back-up zone for recording a copy of the original PAC. In view of a direction of writing from the inner circumference to the outer circumference of the disc, it is preferable that the original PAC is recorded on the PAC2 zone, and the back-up PAC is recorded on the PAC1 zone. The PAC zone, provided for solving the problems liable to happen when an old version drive fails to detect functions on the disc added from a new version of drive, has an "unknown rule".

The "unknown rule" has rules defined thereon for controlling predictable operations of the disc, i.e., controls starting from basic control of read, write, and the like to linear replacement of a defective zone, logical overwrite, and the like. Accordingly, an area is provided on the disc where the "unknown rule" is applicable thereto, having segments for defining an entire disc, or a certain portion of the disc, which will be described in more detail in a later process. Thus, by defining an area to which the old version drive has access by using the "unknown rule", the new version of optical disc reduces unnecessary access operation of the old version drive.

Moreover, by defining an accessible area on a physical area of the disc for the old version drive to access by using the PAC, a data area having a user data recorded thereon can be protected more robustly, and improper access from an outside of the disc, such as hacking, can be protected. In the meantime, the INFO2 zone and the INFO1 zone having the PAC2 and PAC1 zones therein in the lead-in zone will be reviewed in view of writable characteristics of the high density optical disc.

Figures 2, 3:
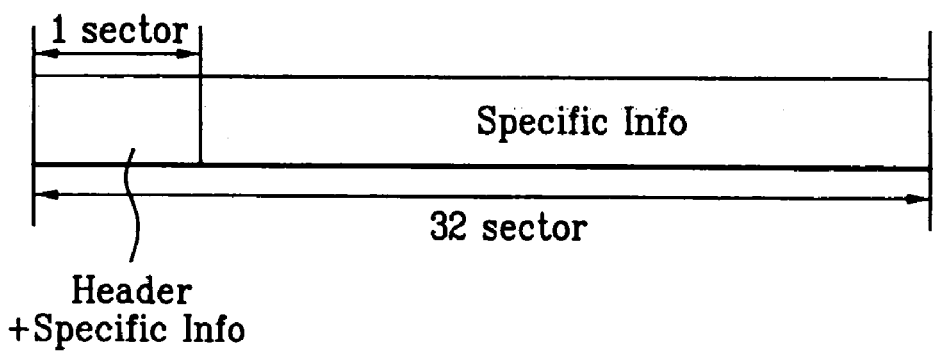
FIG. 2 illustrates configurations of INFO2 zone and INFO1 zone on the high density optical disc according to the present invention.
FIG. 3 illustrates a PAC recorded on the high density optical disc according to the present invention.

FIG. 2 illustrates configurations of the INFO2 zone and the INFO1 zone on the high density optical disc according to the present invention. Referring to FIG. 2, in case of BD-RE of the high density optical disc, the INFO2 zone has 256 clusters including 32 clusters of PAC2 zone, 32 clusters of defect management area (DMA) 2 zone for management of defects, 32 clusters of control data (CD) 2 zone having control information recorded thereon, and 32 clusters of buffer zone (BZ) 3 zone of a buffer zone. The INFO1 zone includes 32 clusters of BZ2 zone of a buffer area, 32 clusters of drive area which is a drive area for storing specific information specific to a drive, 32 clusters of DMA1 zone for managing defects, 32 clusters of CD1 zone for recording control information, and BZ1-PAC1 zone for utilizing as the PAC zone.

In case of the high density optical disc of writable once (BD-R), the INFO2 zone has 256 clusters including a PAC2 zone, a DMA 2 zone, a CD 2 zone, and a BZ 3 zone, each with 32 clusters, and the INFO1 zone includes a BZ2 zone, a DMA1 zone, a CD1 zone, and BZ1-PAC1 zone, each with 32 clusters, and 128 clusters of drive area. Thus, the PAC zones of the present invention are assigned to the INFO2 zone and the INFO1 zone in the lead-in zone by 32 clusters respectively according to rewritable characteristics of the high density optical disc. In the PAC zone of 32 clusters, one PAC has one cluster. A structure in which one PAC is recorded at a size of one cluster will be described with reference to FIG. 3.

FIG. 3 illustrates a structure of a PAC recorded on the high density optical disc according to the present invention. Referring to FIG. 3, one PAC of one cluster size (32 sectors) includes a header zone, and a specific information zone specific to an optical disc drive. The PAC header zone has 384 bytes allocated to a first sector of the PAC, for recording various kinds of PAC information, such as information on an "unknown PAC rule" and segments, and the other area of the PAC zone has specific information specific to the optical disc drive which is called "known rule" recorded thereon.

A detailed structure of the PAC recorded in above structure will be described with reference to FIG. 4. For simplicity, in the description of the present invention, particular fields of the PAC that require more detailed description will refer to drawings that illustrate the fields. FIG. 4 illustrates a structure of a PAC on the high density optical disc according to the present invention. Referring to FIG. 4, as described above, the PAC includes a header portion applicable to all PACs, and an area having specific information specific to the drive recorded thereon.

In turn, the header portion includes 4 bytes of "PAC_ID", 4 bytes of "Unknown PAC Rules", 1 byte of "Entire Disc Flag", 1 byte of "Number of Segments", and 32 segments "Segment_~Segment_31" each with 8 bytes. The "PAC_ID" is a field for providing the present PAC status and identification codes, wherein if the "PAC_ID" has '00 00 00 00' bits, the "PAC_ID" indicates that the present PAC is not used, if the "PAC_ID" has 'FF FF FF FE' bits, the "PAC_ID" indicates that the present PAC zone is not available for use due to reasons of defects or the like, and if the "PAC_ID" has 'FF FF FF FF' bits, the "PAC_ID" indicates that the present PAC zone is available for use again even if the PAC zone is used in the past.

Moreover, by recording the "PAC_ID" in bits agreed beforehand, such as '54 53 54 00' bits, the "PAC_ID" is used as a code for determining if the disc is one that the present drive can make free access. More specifically, if the present drive does not know the "PAC_ID" applied thus, determining that this is a case when the present drive cannot understand the present PAC under a reason of version mismatch, or the like, the '54 53 54 00' bits are used as a code requiring reference to information recorded on the "Unknown PAC Rules" field. As described above, the "Unknown PAC Rules" field is used as a field that designates an operation range of the drive that cannot understand the present PAC, which will be described with reference to FIG. 5.

FIG. 5 illustrates a configuration of an "Unknown PAC Rules" field according to the present invention. Referring to FIG. 5, definition of controllability of various areas on the disc is enabled by the "Unknown PAC Rules". The "Area" on the table represents the controllable areas on the disc, the "Control" represents control types, such as read/write and so on, and "Number of bits" represents a number of bits required for the control. The additional bits in the "Number of bits" represent cases of dual layer disc with two recording/reproduction sides. For example, read/write controllability of the PAC zone can be represented with "PAC zones 1, 2" fields, and write controllability of defect management zone can be represented with "DMA Zone 1, 2" fields. Write controllability of a replacement area for a defective area can be represented with a "Replacement Clusters" field, read/write controllability of a data zone can be represent with a "Data Zone" field, and logical overwrite controllability can be represented with a "Logical Overwrite" field.

Evidently, the write controllability is physically applicable only to re-writable discs BD-RE, and BD-R, and, also the write controllability of a replacement area for a defective area is also applicable to the re-writable discs BD-RE, and BD-R. Thus, it is required to understand that the subject matter of the present invention is dependent on the re-writable characteristics of the high density optical disc. By using the above described method, the "Unknown PAC Rules" field enables designation of a controllable area on the disc for the drive of version mismatch. Moreover, above method is applicable, not only to the drive of version mismatch, but also to control of access to a particular physical area on a disc at a user's option.

In the meantime, the "Entire Disc Flag" field in FIG. 4 is used as a field for informing that the PAC is applicable to an entire area of the disc, and the "Number of Segments" field is a field representing a number of segment area the PAC is applicable thereto. Maximum 32 segments can be allocated to one PAC, and information on the allocated segments is written on fields of "Segment_0" to "Segment_31" each with 8 bytes. Each of the "Segment_0~Segment_31" fields has the first PSN and the last PSN of the allocated segment area recorded thereon.

Figure 6:
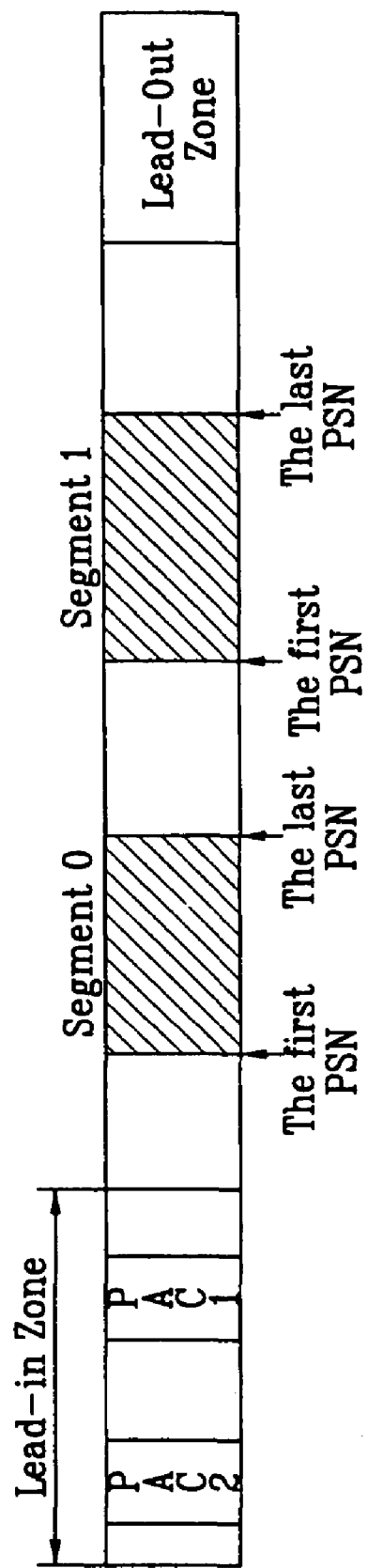
FIG. 6 illustrates segment zones on the high density optical disc according to the present invention.

The segment will be described in more detail with reference to the accompanying drawings. FIG. 6 illustrates segment zones on the high density optical disc according to the present invention. Referring to FIG. 6, if required, there can be maximum 32 segment areas on the high density optical disc of the present invention, for applying the PAC thereto starting from "Segment_0" in succession. In this case, by writing the first PSN which indicates a starting position of the allocated segment area, and the last PSN which indicates the last position of the allocated segment area on "Segment" fields of PAC2 and PAC1 zones, the optical disc drive is made to know positions of the segment areas. None of the plurality of allocated segments overlap, and the starting and last positions are designated at boundaries of clusters.

When a defective area occurs in the segment area allocated, in other words, in case of a writable high density optical disc BD-RE, or WO, a data to be recorded on the defective area is recorded on a replacement area, such as a spare area. In the present invention, the replacement area is also defined as an area belonging to the segment area, which will be described with reference to the attached drawings.

Figure 7:
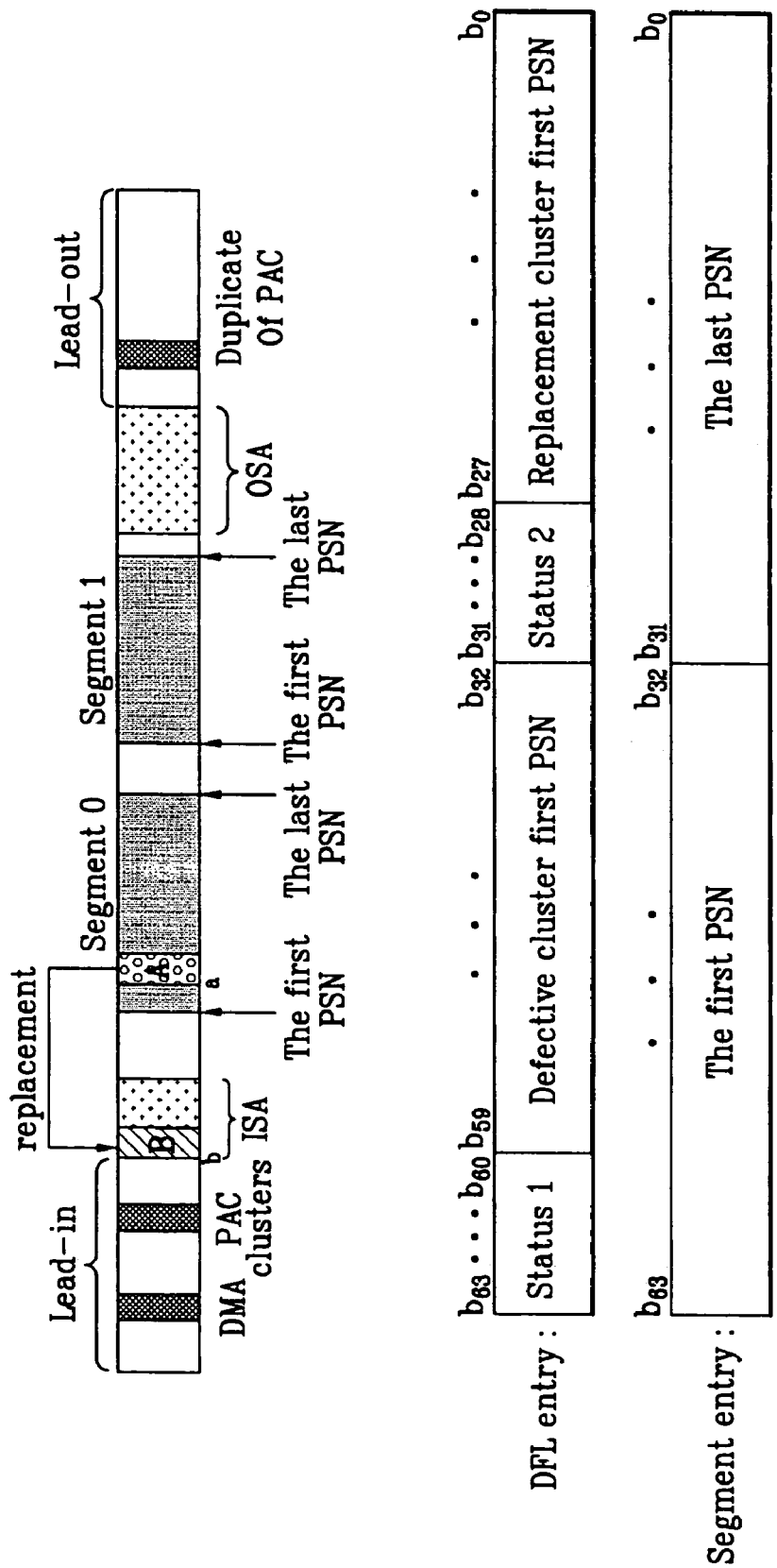
FIG. 7 illustrates a PAC method of the high density optical disc according to the present invention.

FIG. 7 illustrates a diagram showing a PAC method of the high density optical disc according to the present invention. Referring to FIG. 7, with regard to the segment area having the PAC of the present invention applied thereto, if the defective area "A" occurs at the segment area, a data to be written on the defective area "A" is written on the spare area ISA or OSA in replacement, and information on the replacement is written on a defect management area (DMA) in the lead-in zone as a defect list (DFL) entry. The DFL entry includes "Status 1" and "Status 2" fields, for recording information on types of the DFL entries, a "Defective Cluster first PSN" field for recording a first physical sector number of a defective cluster, and "Replacement Cluster first PSN" for recording a first physical sector number of replacement cluster.

The "Status 1" field has a '0000' bit recorded thereon for indicating that the defective area is of a RAD (Re-Allocatable Defect) type in which the defective area is replaced normally, the "Defective Cluster first PSN" field has 'a', the first PSN of the defective area, recorded thereon, the "Status 2" field has a '0000' bit recorded thereon for indicating that the "Status 2" field is not used in the case of the writable high density optical disc (in case of the high density optical disc of writable once, the bit is used for indicating that one cluster has a defect), and the "Replacement Cluster first PSN" field has 'b' recorded thereon, which is the first physical sector number of the replacement area. In this case, since only one time of writing is physically possible in the high density optical disc of writable once (WO), it is preferable that the data to be written on the defective area is recorded on a temporary disc management area (TDMA) on the disc separate from the DMA area as a temporary defect list (TDFL) having a structure the same with the DFL entry at first, and is written on DMA area as the DFL when the user requires, or after a disc closing at the time of writing completion.

In the present invention, the replacement area 'B' where the data to be written on the defective area 'A' is written thereon in replacement is defined as the replacement area 'B' belongs to the segment the defective area 'A' belongs by using the DFL entry. Since this method enables to dispense with the requirement for handling the replacement area 'B' as a separate segment, waste of the segment areas a number of which is limited to 32 is prevented, and effective segment management by using the PAC is made possible. Thus, though the preferred embodiment of the present invention is described by taking a RAD type as an example, in which replacement of the defective area is made within one cluster, it is apparent in a case of a consecutive re-allocatable defect (CRD) type in which defective areas occurred at a plurality of consecutive clusters are replaced that the defective area is managed in a fashion identical to the segment area the defective area belongs thereto.

In the meantime, referring to FIG. 7, the PAC in the lead-out zone, a duplicate of the PAC of an original PAC, is recorded for more robust protection of the PAC, and is recorded in an INFO zone of the lead-out zone. As described above, the position information on the segment area recorded on the "Segment" field by using a segment entry has the first PSN and the last PSN each with 32 bits. In this instance, the position information on the segment area recorded on the "Segment" field may not be represented with the first PSN and the last PSN, but with physical sector numbers of clusters taking an actual recording unit on the optical disc is clusters into account, which will be described with reference to FIG. 8.

Figure 8:
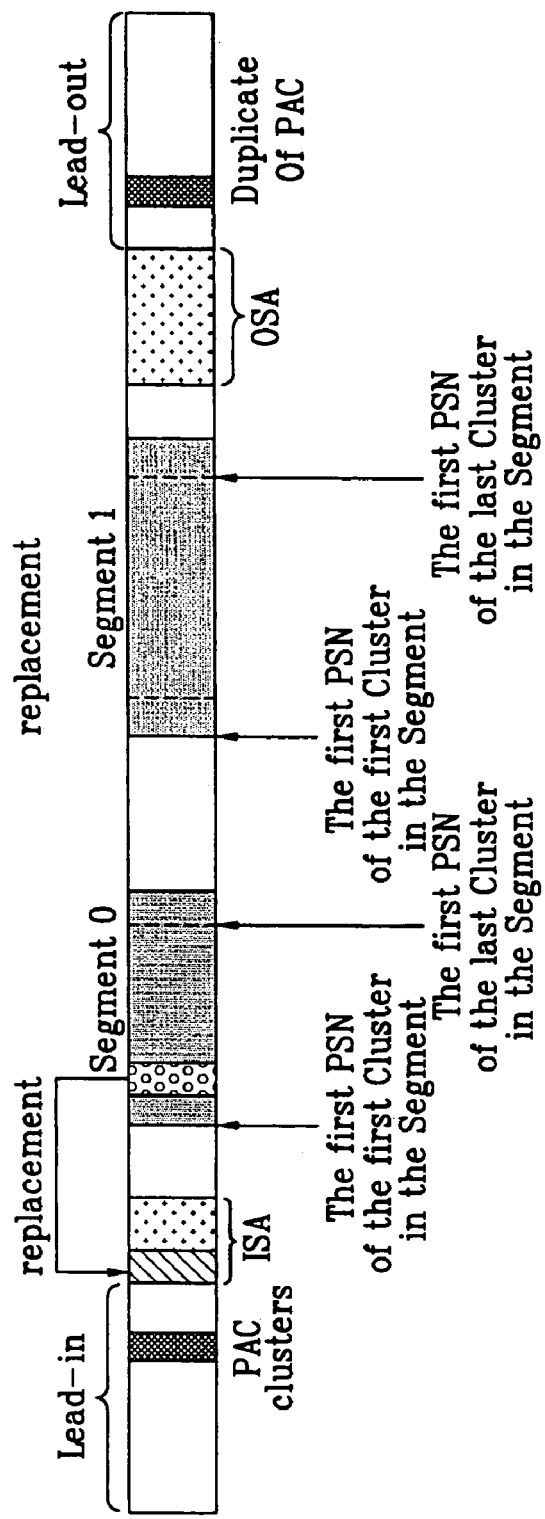
FIG. 8 illustrates a method for recording segment position information on the high density optical disc according to the present invention.

FIG. 8 illustrates a method for recording segment position information on the high density optical disc according to the present invention. Referring to FIG. 8, with regard to the plurality of segment areas managed by the PAC, a segment entry having position information of each of the segment areas includes the "first PSN of the first cluster in the Segment" field and the "first PSN of the last cluster in the Segment" field. More specifically, as described above, since the optical disc is written in cluster units, a position of the segment area is represented in cluster units, with the first physical sector number of the first cluster of the segment and the first physical sector number of the last cluster of the segment. This method is convenient in view of firmware for operation of the drive.

Figure 9:
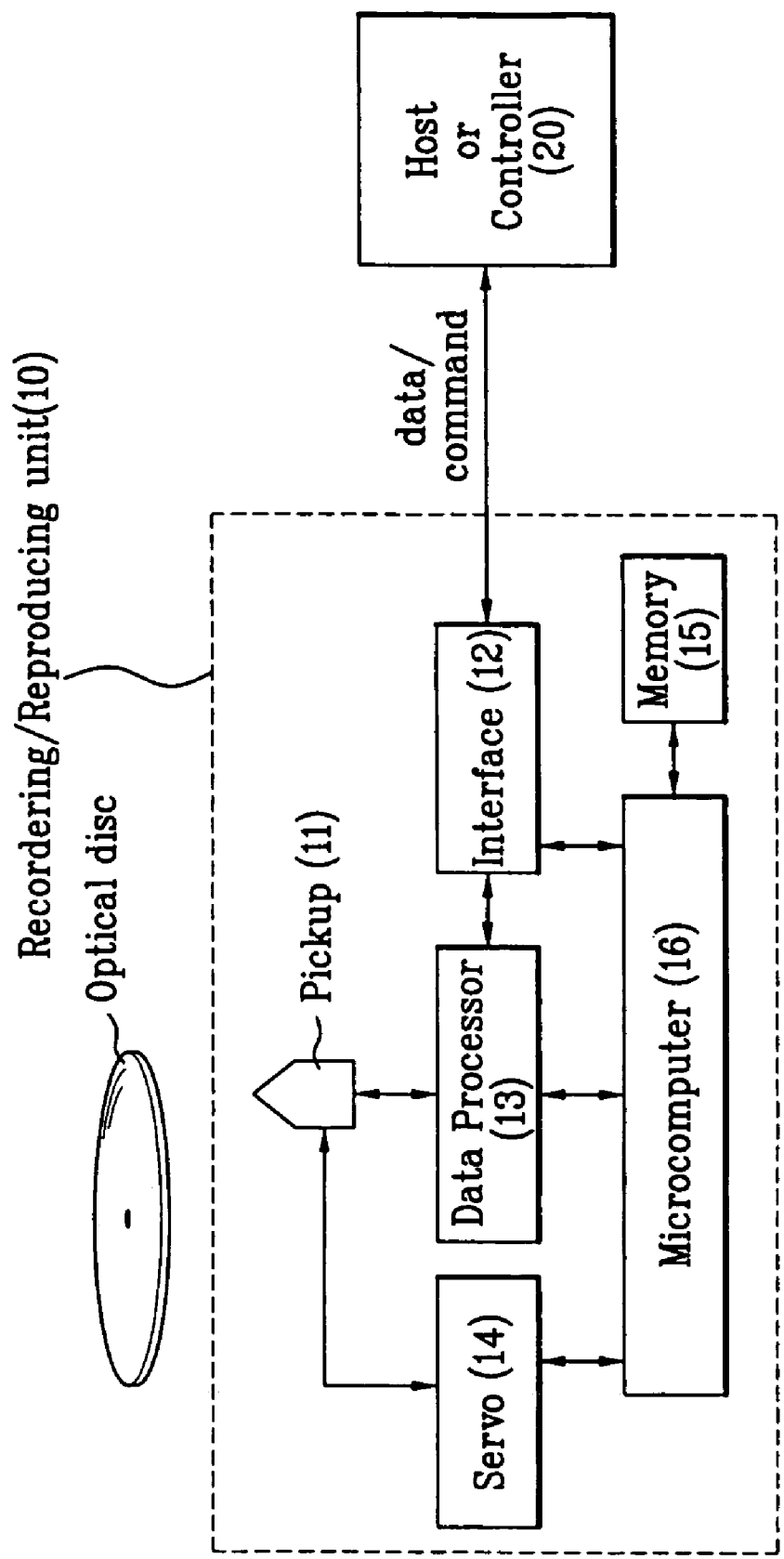
FIG. 9 illustrates a block diagram of an optical recording and/or reproducing apparatus according to the present invention.

FIG. 9 illustrates a block diagram of an optical recording and/or reproducing apparatus according to the present invention. Referring to FIG. 9, the optical recording and/or reproducing apparatus includes a recording/reproducing device 10 for performing recording/reproduction on the optical disc, and a host, or controller 20 for controlling the recording/reproducing device 10. (Herein, the recording/reproducing device 10 is often referred to as an "optical disc drive", and both terms will be used in the description of the present invention).

More specifically, the host 20 gives a writing or reproduction order to write or reproduce to/from a particular area of the optical disc to the recording/reproducing device 10, and the recording/reproducing device 10 performs the recording/reproduction to/from the particular area in response to the order from the host 20. The recording/reproducing device 10 includes an interface unit 12 for performing communication, such as exchange of data and order, with the host 20, a pickup unit 11 for writing/reading a data to/from the optical disc directly, a data processor 13 for receiving signal from the pickup unit 11, and recovering a desired signal value, or modulating a signal to be written into a signal able to be written on the optical disc, and forwarding, a servo unit 14 for controlling the pickup unit 11 to read a signal from the optical disc accurately, or write a signal on the optical disc accurately, a memory 15 for temporary storage of various kinds of information including management information, and data, and a microcomputer 16 for controlling various parts of the recording/reproducing device 10.

A method for recording a PAC on a high density writable optical disc by using the optical recording and/or reproducing apparatus will now be described. Upon inserting the optical disc into the optical recording and/or reproducing apparatus, all management information is read from the optical disc and stored in the memory of the recording/reproducing device 10, for use at the time of recording/reproduction of the optical disc. Herein, if the user desires to write on a particular area of the optical disc, the host 20, which consider such desire of the user as a writing order, provides information on a desired writing position to the recording/reproducing device 10, along with a set of data that is to be written.

Then, the microcomputer 16 in the recording/reproducing device 10 receives the writing order, determines if the area of the optical disc in which the host 20 desires to write is a defective area or not from the management information stored in the memory 15, and performs data writing according to the writing order from the host 20 on an area which is not the defective area. In this case, if it is determined that the writing on an entire disc or on the particular area includes new features which a related art recording/reproducing device is not provided with, leading the related art recording/reproducing device to fail to sense, or if it is intended to restrict functions, such as writing or reproducing to/from the particular area of the disc according to requirements requested by the user, the microcomputer 16 of the recording/reproducing device 10 writes control information of the area on the PAC zone on the disc as "Unknown PAC rule". The microcomputer 16 of the recording/reproducing device 10 also writes PAC information, such as the PAC_ID for a written state, and segment information which is control information on the particular area of the disc.

If a defective area occurs at the segment area, by writing the data to be written on the defective area on a replacement area, such as the spare area, and the like, and information on this on the DMA area as a DFL entry, it is defined that the replacement area belongs to the segment area to which the defective area belongs. Moreover, the position of the segment area may be indicated with the first PSN and the last PSN of the cluster, or the first PSN of the first cluster and the last PSN of the last cluster of the segment in cluster units. Accordingly, the microcomputer 16 provides position information of the area the data is written thereon, or the PAC zone, and the data to the servo unit 14 and the data processor 13, so that the writing is finished at a desired position on the optical disc through the pickup unit 11.

In the meantime, a method for recording and/or reproducing the high density optical disc having the PAC information written by above method will be described. Upon inserting an optical disc into the optical recording and/or reproducing apparatus, all management information is read from the optical disc, and stored in the memory of the recording and reproducing device 15, for use at the time of recording and reproduction of the optical disc. The information in the memory 10 includes position information of various zones inclusive of the PAC zone on the disc. Then, a PAC_ID field of the PAC is examined, for verifying if the PAC_ID of the PAC of the PAC zone is a sensible PAC_ID. As a result of the verification, if the written PAC_ID is sensible, determining that it is a case when the recording and reproducing device having written the data on the disc has a version identical to a version of the present recording and reproducing device, or a case when there is no separate writing/reproduction restrictions, the recording/reproduction is performed according to the order from the host 20.

When the sensing of a code written on the PAC_ID fails, determining that it is a case when there are restrictions due to reasons, such as the recording and reproducing device having written the data on the disc has a version different from a version of the present recording and reproducing device, the recording/reproduction is preformed according to the order from the host with reference to recording/reproduction restriction areas on the disc written on the "Unknown PAC rule" and "Segment". In this case, if there is a defective area in the segment area recorded on the "Segment", and a data to be written is written on a replacement area by the DFL information written on the DMA area, the data on the replacement area is determined to be the segment area, the recording/reproducing is performed according to restriction of setting of recording/reproducing of the segment area. For this, the microcomputer 16 provides the position information and data according to the order of the host to the servo unit 14 and the data-processor 13, so that the recording/reproduction is finished at a desired position on the optical disc through the pickup unit 11.

The method and apparatus for recording and/or reproducing data to/from the recording medium have the following advantages. The definition of an accessible area of a disc of a related art version drive by using PACs permits robust protection of a data area having a user data recorded thereon, to cut off improper external access from a hacker or the like. Also, the PAC which manages entire data zone or the segment areas on the disc permits effective data recording and reproducing to/from the high density optical disc. In addition, a method for handling a case when a defect occurs at a segment area on the disc managed by the PAC is suggested, to permit an effective data recording and reproducing to/from the high density optical disc. And, finally, by recording position information of the segment area on the disc managed by the PAC in clusters, it is convenient in view of firmware for operation of the drive.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A recording medium comprising:
    a user data area for storing user data; and
    a control data area storing physical access control information for controlling access to the recording medium, the physical access control information including,
    a predetermined rule used when the physical access control information is not identified by an apparatus attempting to access the recording medium, the predetermined rule indicating whether it is allowed for the apparatus to record/reproduce data from/on the control data area,
    a segment field including position information for specifying segment regions in the user data area, to which the physical access control information applies, the position information including a first physical sector number indicates the start position of the segment region and a second physical sector number indicating the last position of the segment region, and
    a number of segments field indicating the number of segment regions specified by the segment field,
    wherein the total number of the segment region in the recording medium is limited to a predetermined value.

2. The recording medium of claim 1, wherein the position information includes a first or last sector number of the first recording unit and a first or last sector number of the last recording unit in each segment region.

3. The recording medium of claim 1, further comprising:
    a second control data area storing a copy of the physical access control information.

4. The recording medium of claim 3, wherein the specific function or application includes controlling reading data form and/or writing data to the segment regions.

5. The recording medium of claim 1, wherein the physical access control information recorded in a recording unit of the recording medium.

6. The recording medium of claim 1, wherein the predetermined rule includes data zone bits for the segment region, the data zone bits indicating actions available for each of the segment regions.

7. The recording medium of claim 1, wherein the recording medium is a rewritable recording medium.

8. The recording medium of claim 1, wherein the recording medium is a write-once recording medium.

9. The recording medium of claim 1, wherein the physical access control information includes,
    a header portion storing the position information of the segment regions, and
    a specific information portion storing information specific to the physical access control information.

10. The recording medium of claim 1, wherein total number of the segment regions in the data area is limited to the predetermined value.

11. The recording medium of claim 1, wherein the physical access control information further includes a identification field for indicating the status of the physical access control information.

12. The recording medium of claim 11, wherein the identification field indicates the status of the physical access control information as one of not used, not available for use and available for re-use.

13. A method of recording data on a recording medium, the method comprising:
    recording, on a control data area of the recording medium, physical access control information for controlling access to the recording medium, the physical access control information including,
    a predetermined rule used when the physical access control information is not identified by an apparatus attempting to access the recording medium, the predetermined rule indicating whether it is allowed for the apparatus to record/reproduce data from/on the control data area,
    a segment field including position information for specifying segment regions in a user data area of the recording medium, to which the physical access control information applies, the position information including a first physical sector number indicates the start position of the segment region and a second physical sector number indicating the last position of the segment region, and
    a number of segments field indicating the number of segment regions specified by the segment field, wherein the total number of the segment regions in the recording medium is limited to a predetermined value; and
    recording data on the segment region of the data area according to the physical access control information.

14. The method of claim 13, further comprising:
    recording a copy of the physical access control information on the recording medium.

15. The method of claim 13, wherein the address data includes a first or last sector number of the first recording unit and a first or last sector number of the last recording unit in each segment region.

16. The method of claim 13, wherein the predetermined rule includes data zone bit for the segment regions, the data zone bits indicating actions available for each of the segment regions.

17. The method of claim 16, wherein the actions available include reading and/or writing.

18. An apparatus for recording data on a recording medium, the apparatus comprising:
- an optical device configured to record data on the recording medium; and
- a controller operably connected to the optical device and configured to control the optical device to record, on a control data area of the recording medium, physical access control information for controlling access to the recording medium, the physical access control information including,
- a predetermined rule used when the physical access control information is not identified by an apparatus attempting to access to the recording medium, the predetermined rule indicating whether it is allowed for the apparatus to record/reproduce data from/on the control data area,
- a segment field including position information for specifying segment regions in a user data area of the recording medium, to which the physical access control information applies, the position information including a first physical sector number indicates the start position of the segment region and a second physical sector number indicating the last position of the segment region, and
- a number of segments field for indicating the number of segment regions specified by the segment field, wherein the total number of the segment regions in the recording medium is limited to a predetermined value.

19. The apparatus of claim 18, wherein the controller is further configured to control the optical device to record a copy of the physical access control information on the recording medium.

20. The apparatus of claim 18, wherein the address data includes a first or last sector number of the first recording unit and a first or last sector number of the last recording unit in each segment region.

21. The apparatus of claim 18, wherein the controller is configured to identify the segment region according to the position information.

22. The apparatus of claim 18, wherein the controller is configured to record/reproduce data on/from the segment regions according to the predetermined rule included in the physical access control information.

23. The apparatus of claim 22, wherein the predetermined rule includes data zone bit for the segment regions, the data zone bits indicating actions available for each of the segment regions.

24. The apparatus of claim 23, wherein the actions available include reading and/or writing.

25. The apparatus of claim 18, further comprising:
- a host device configured to generate a command of recording to and/or reproducing from the recording medium.

26. The system of claim 25, wherein the address data includes a first or last sector number of the first recording unit and a first or last sector number of the last recording unit in each segment region.

27. The recording medium of claim 1, wherein the position information includes a first sector number of the first recording unit and a last sector number of the last recording unit in each segment region.

28. The method of claim 13, wherein the address data includes a first sector number of the first recording unit and a last sector number of the last recording unit in each segment region.

29. The apparatus of claim 18, wherein the address data includes a first sector number of the first recording unit and a last sector number of the last recording unit in each segment region.

30. The system of claim 25, wherein the address data includes a first sector number of the first recording unit and a last sector number of the last recording unit in each segment region.

31. A method of reproducing data from a recording medium, the method comprising:
- reading, from a control data area of the recording medium, physical access control information for controlling access to the recording medium, the physical access control information including,
- a predetermined rule used when the physical access control information is not identified by an apparatus attempting to access the recording medium, the predetermined rule indicating whether it is allowed for the apparatus to record/reproduce data from/on the control data area,
- a segment field including position information for specifying segment regions in a user data area of the recording medium, to which the physical access control information applies, the position information including a first physical sector number indicates the start position of the segment region and a second physical sector number indicating the last position of the segment region, and
- a number of segments field for indicating number of segment regions specified by the segment field, wherein the total number of the segment regions in the recording medium is limited to a predetermined value; and
- reproducing data based on the physical access control information.

32. The method of claim 31, wherein the physical access control information is recorded in an inner circumference zone within the recording medium.

33. The method of claim 31, wherein the predetermined rule is used for the access when a version of the physical access control information is not identified by the apparatus.

34. The method of claim 31, further comprising:
- reading a copy of the physical access control information from the recording medium.

35. An apparatus for reproducing data from a recording medium, the apparatus comprising:
- an optical device configured to reproduce data from the recording medium; and
- a controller operably connected to the optical device and configured to read physical access control information for controlling access to the recording medium from a control data area of the recording medium, the physical access control information including,
- a predetermined rule used when the controller can not identify the physical access control information, the predetermined rule indicating whether it is allowed for the apparatus to record/reproduce data from/on the control data area,
- a segment field including position information for specifying segment regions in a user data area of the recording medium, to which the physical access control information applies, and
- a number of segments field indicating number of segment region specified by the segment field,
- wherein the total number of the segment regions in the recording medium is limited to a predetermined value,
- the controller configured to control the optical device to read data based on the physical access control information.

36. The apparatus of claim 35, wherein the controller is configured to control the optical device to read the physical access control information from an inner circumference zone within the recording medium.

37. The apparatus of claim 35, wherein the controller is configured to control the optical device to access the segment regions based on the predetermined rule when the controller can not identify a version of the physical access control information.

38. The apparatus of claim 35, wherein the controller is further configured to control the optical device to read a copy of the physical access control information from the recording medium.

* * * * *